July 9, 1963
P. J. BILY
3,096,797
FLUID CONVEYING APPARATUS
Filed May 9, 1960
13 Sheets-Sheet 1
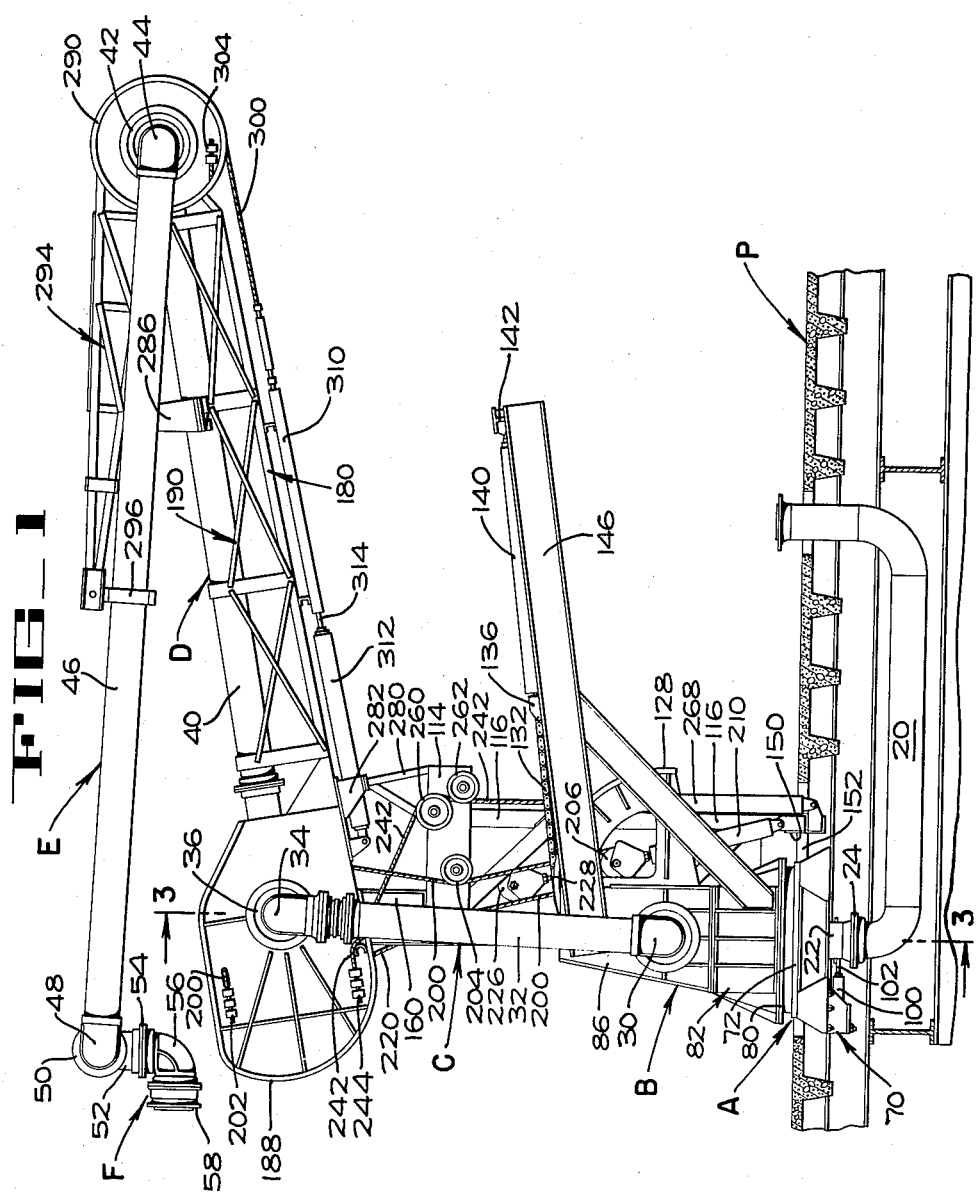
INVENTOR
PETER J. BILY
BY *Hans G. Hoffmeister*
ATTORNEY

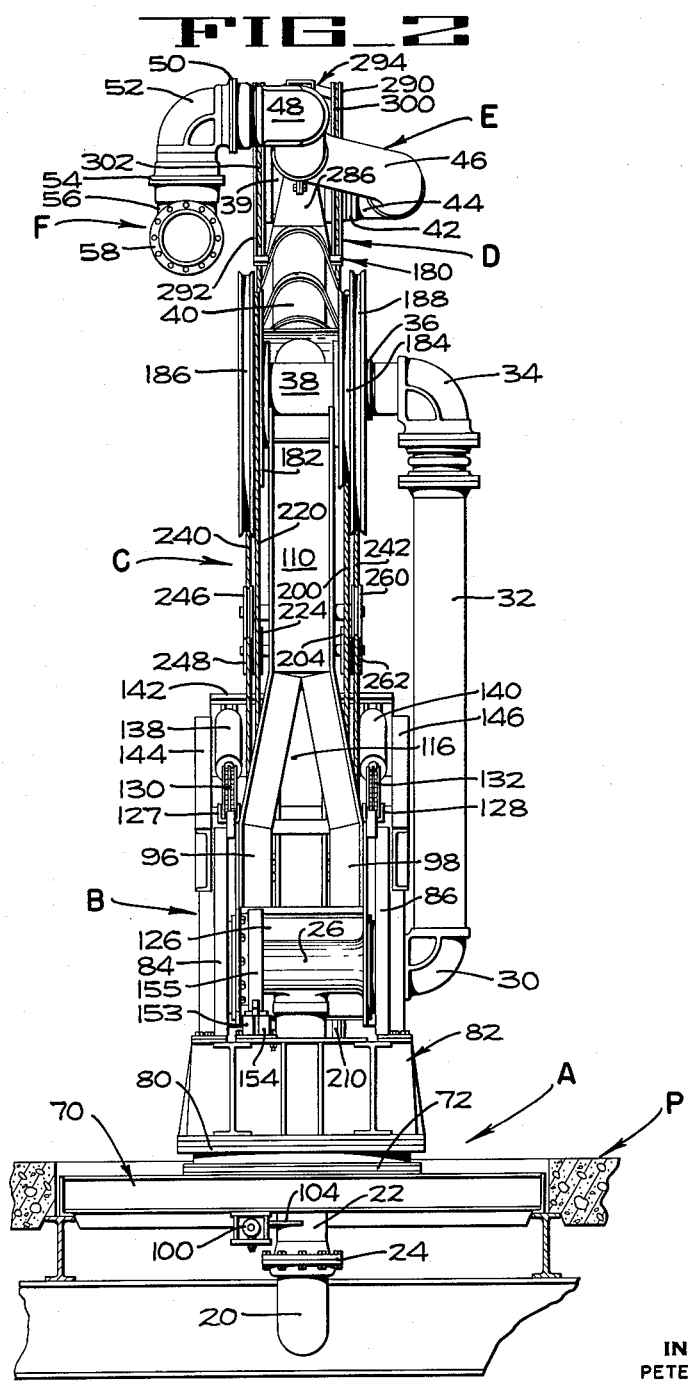

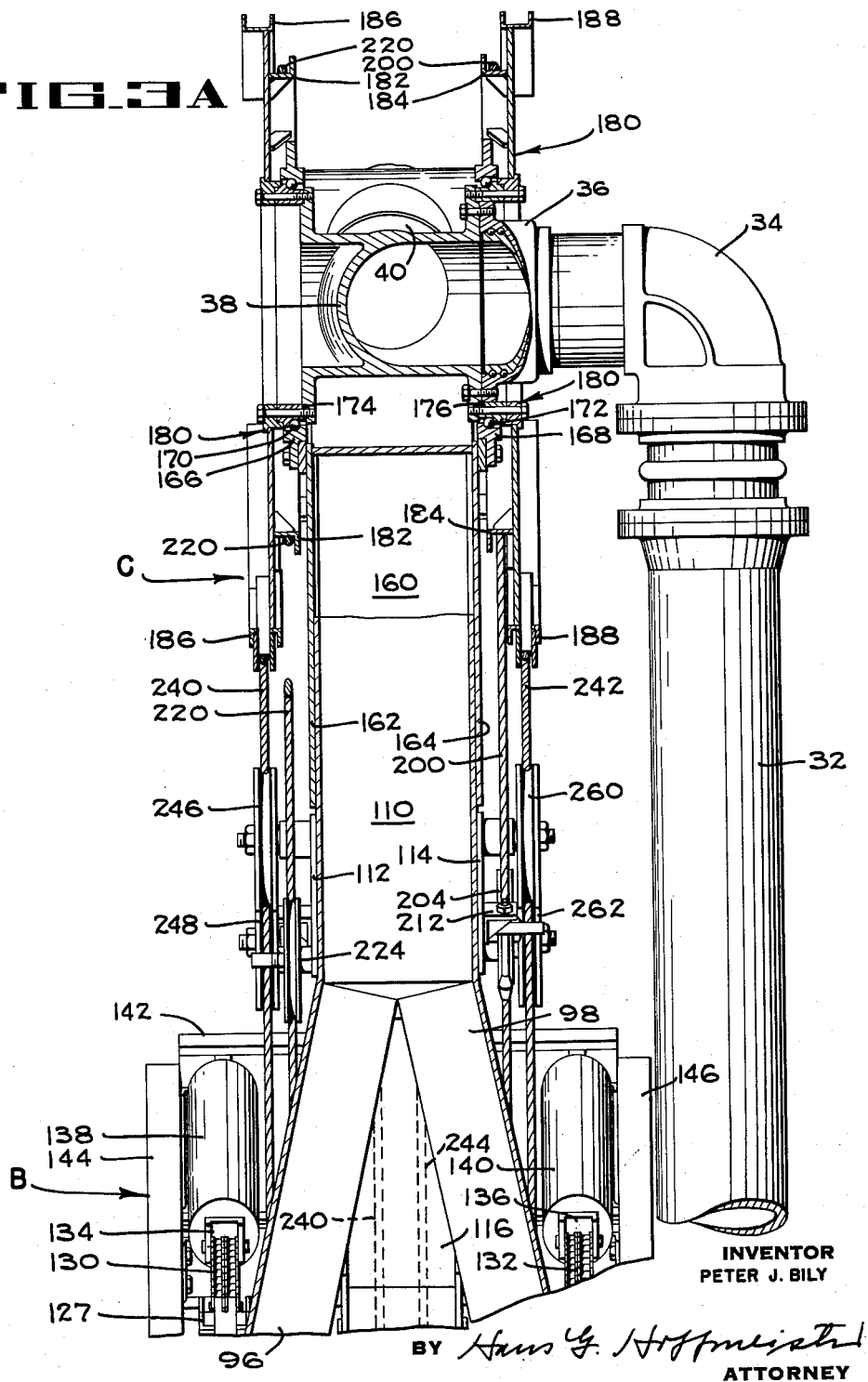

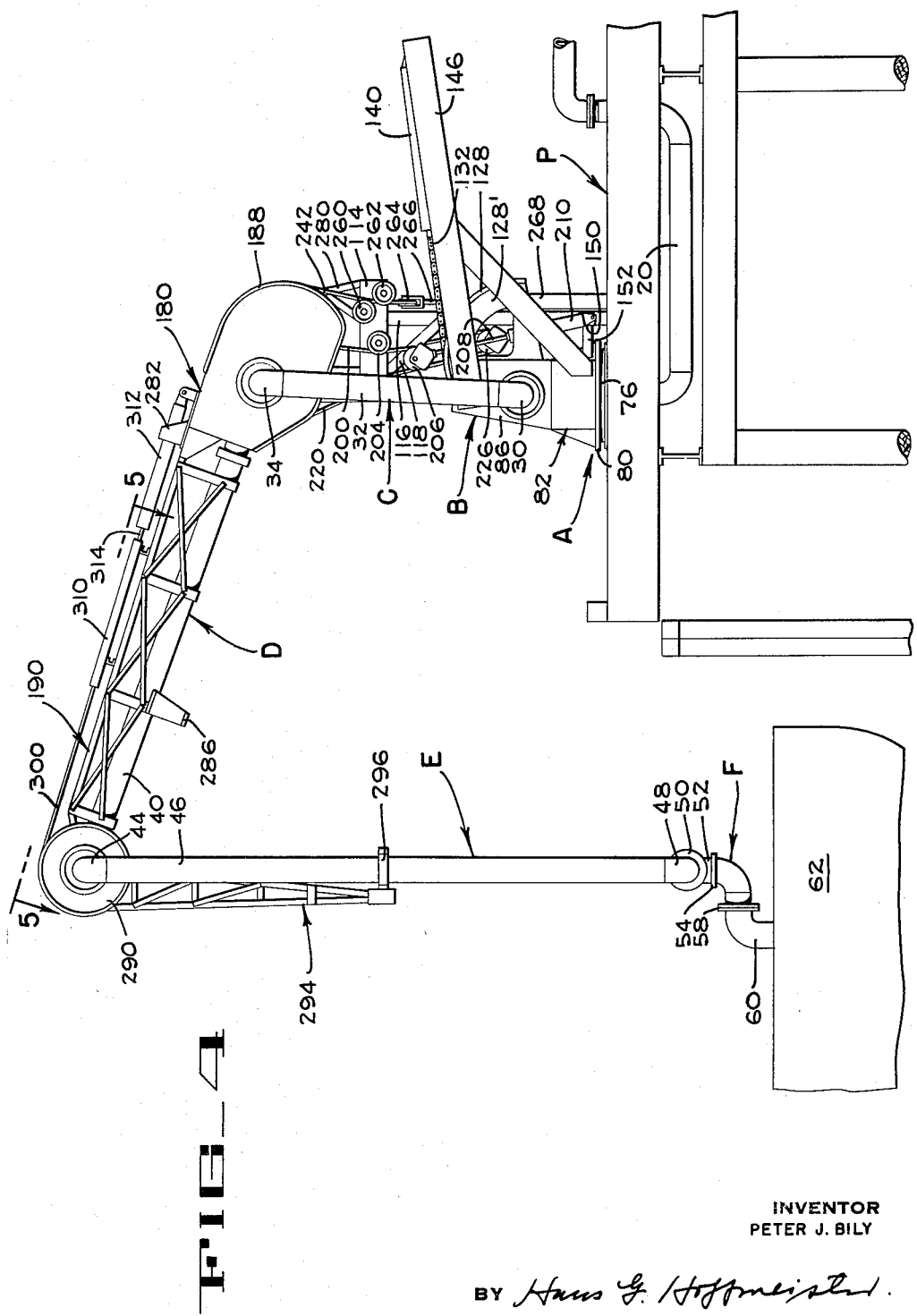

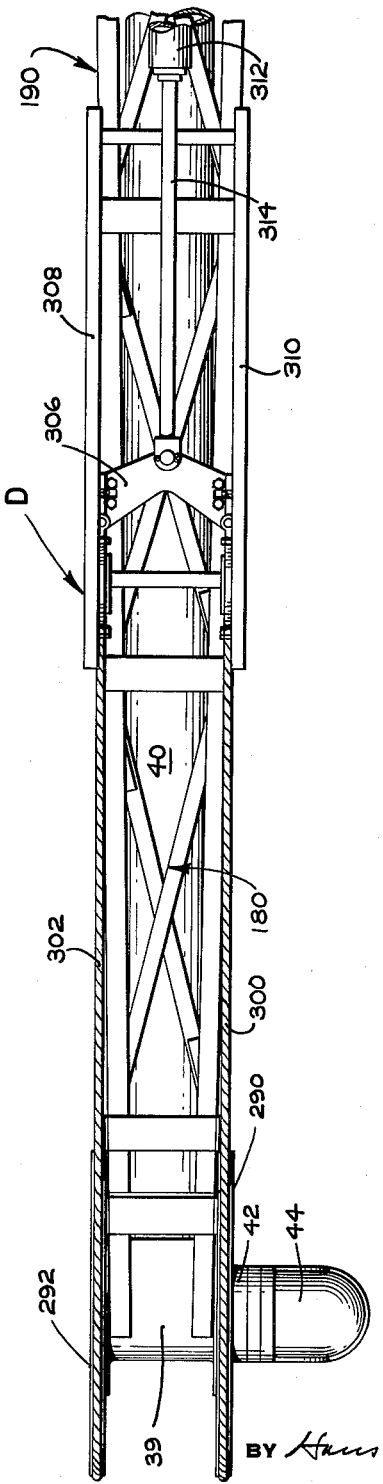

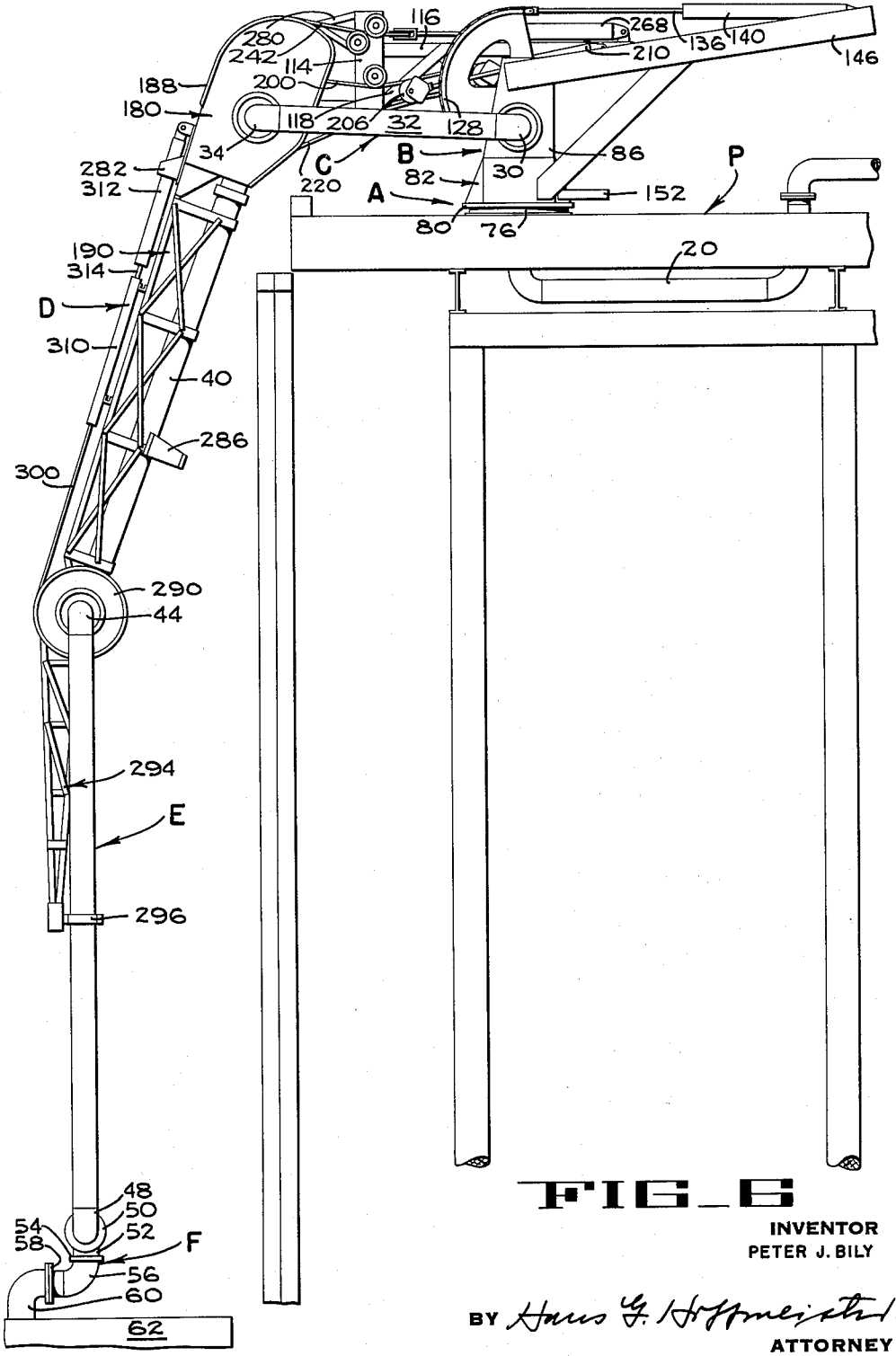
FIG_6
INVENTOR
PETER J. BILY
BY Hans G. Hoffmeister
ATTORNEY

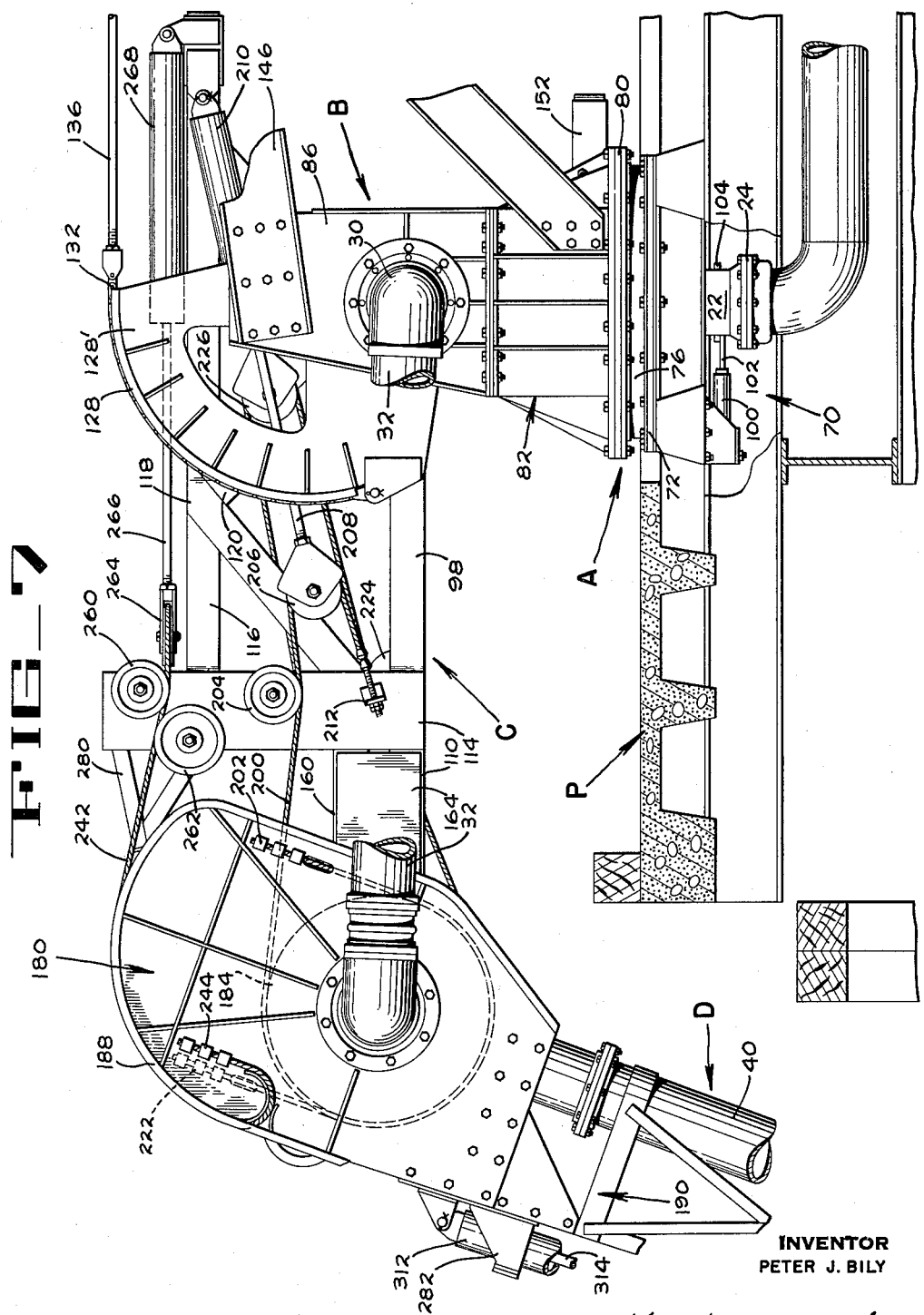

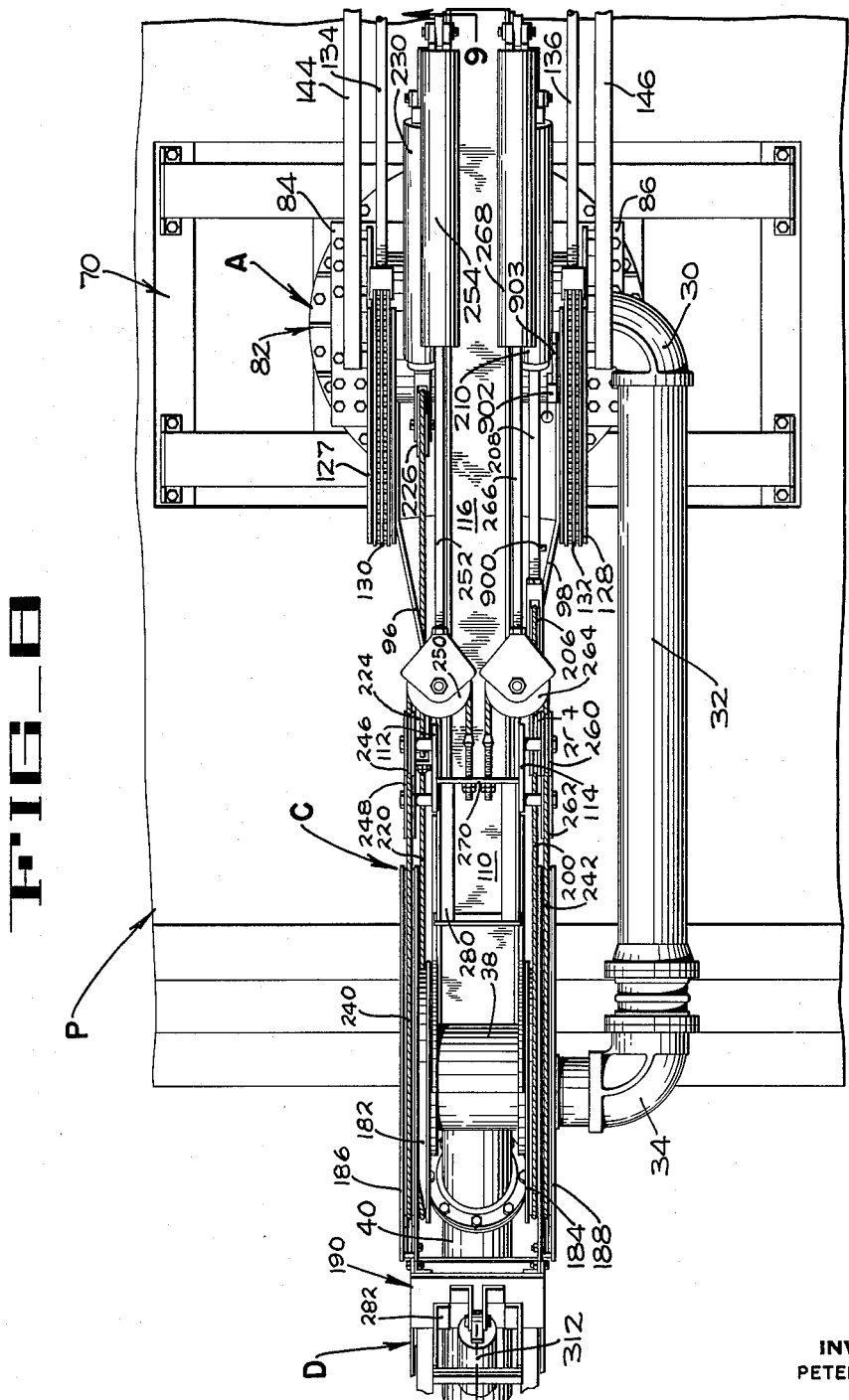

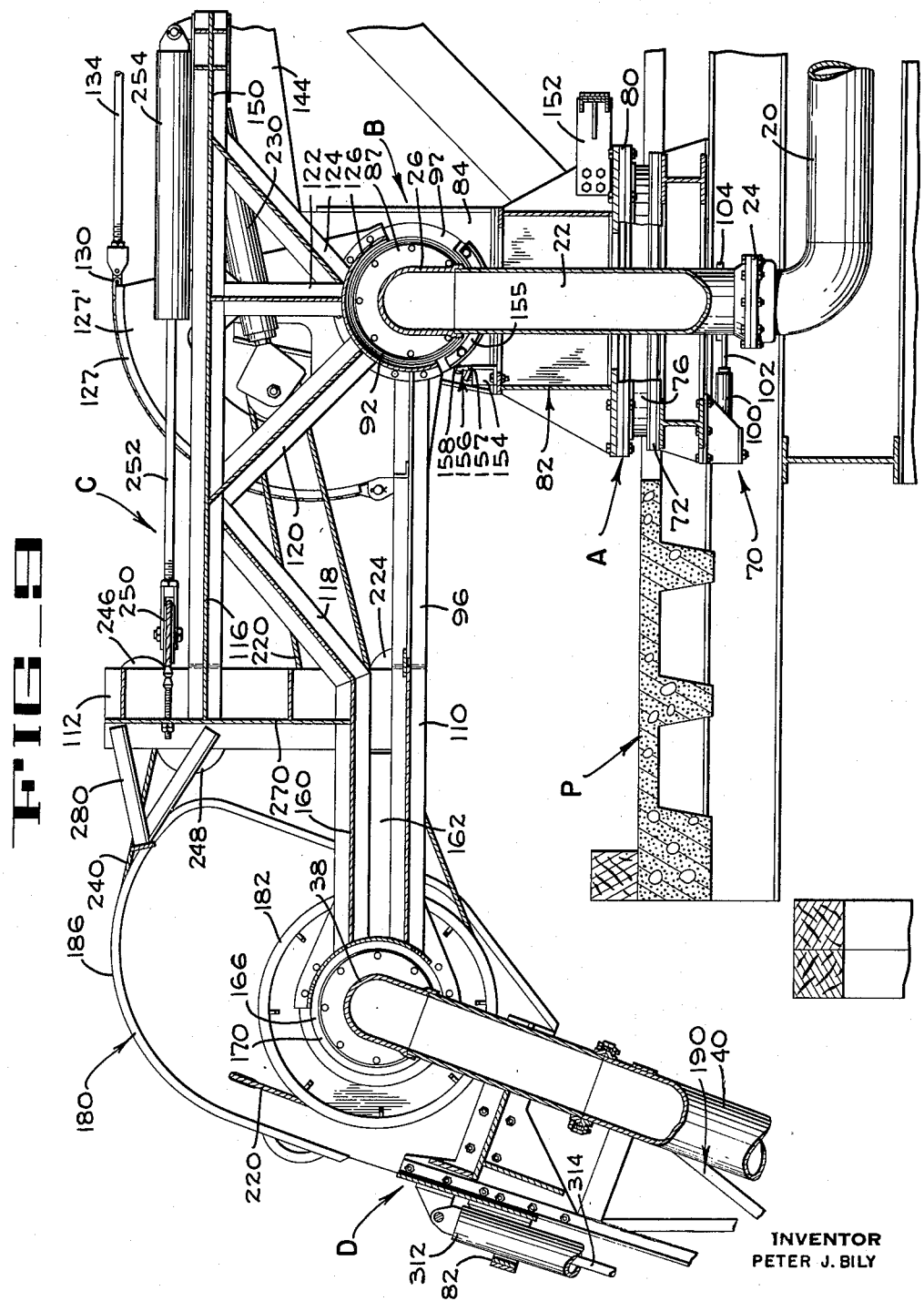

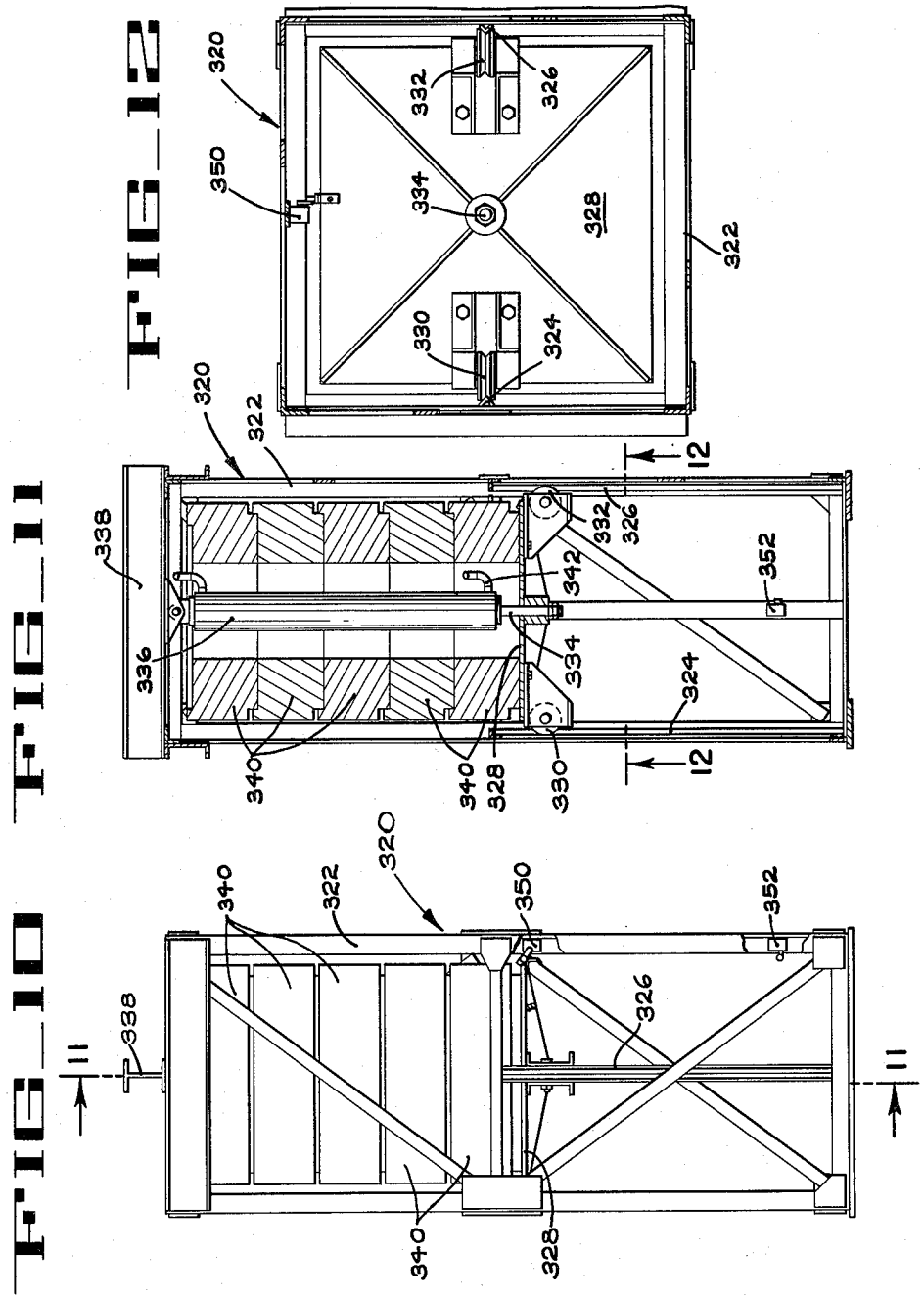

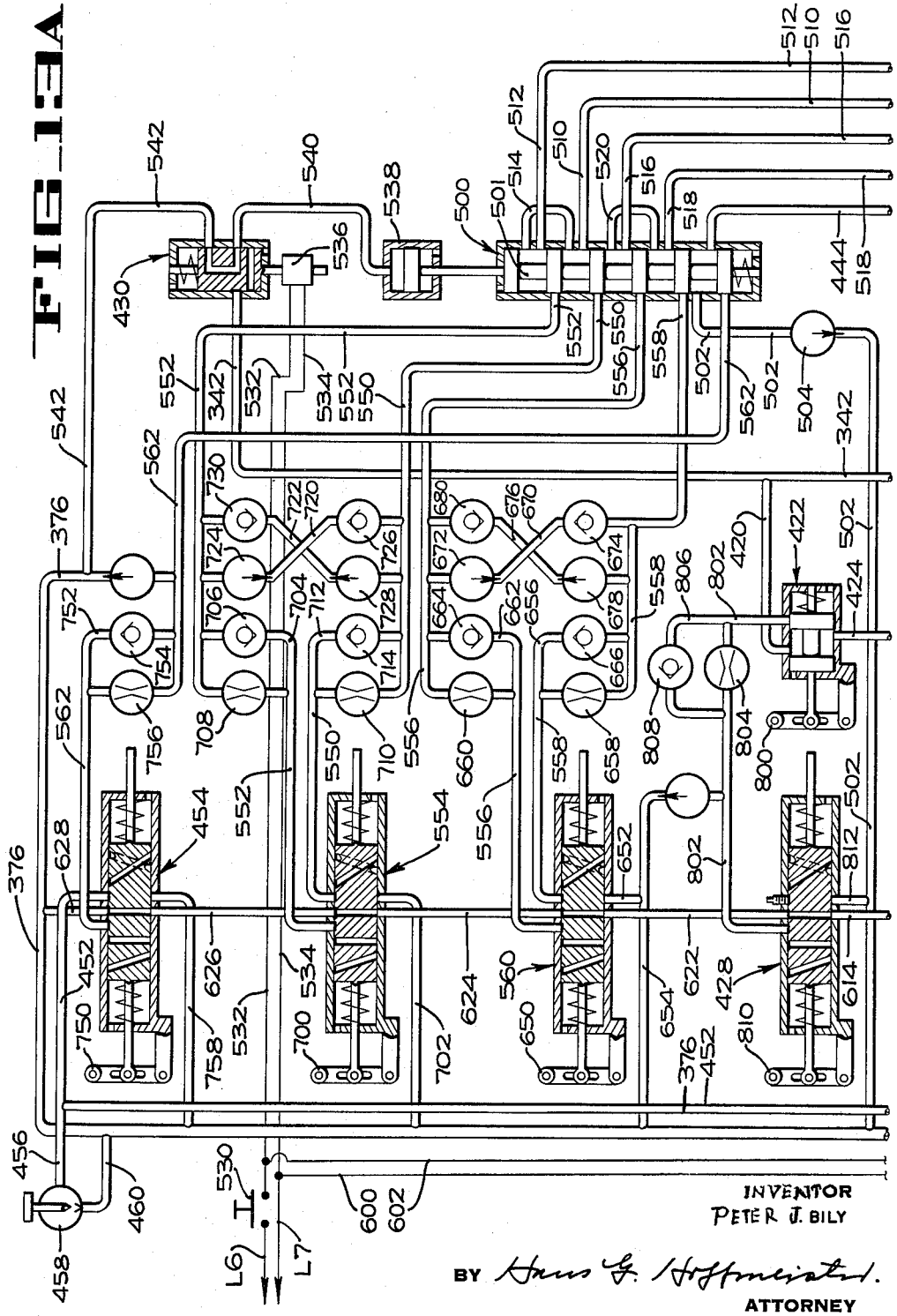

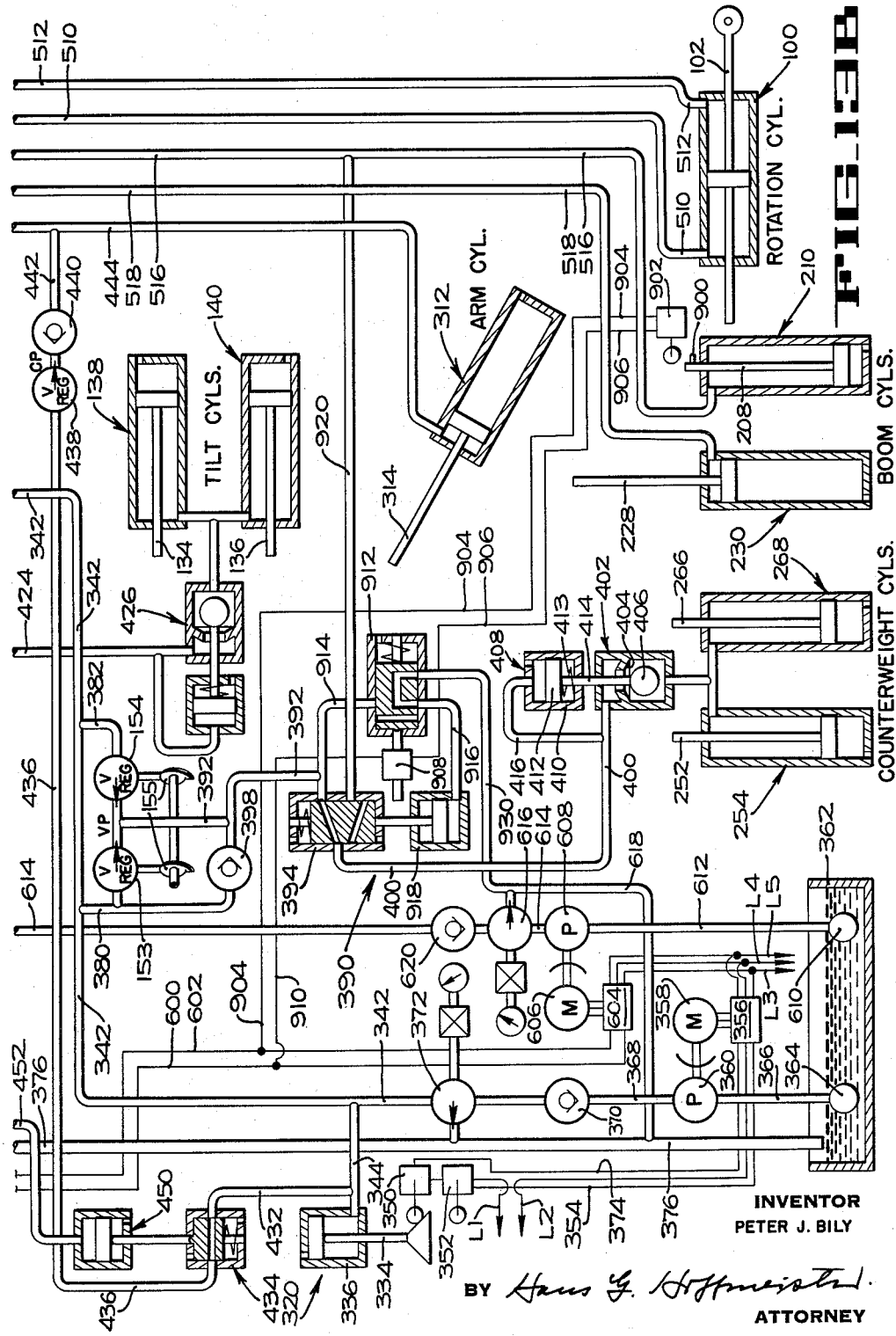

United States Patent Office 3,096,797
Patented July 9, 1963

3,096,797
FLUID CONVEYING APPARATUS
Peter J. Bily, Brea, Calif., assignor, by mesne assignments, to FMC Corporation, San Jose, Calif., a corporation of Delaware
Filed May 9, 1960, Ser. No. 27,918
17 Claims. (Cl. 141—387)

The present invention pertains to apparatus for conveying fluids between two stations which are movable with respect to one another, and more particularly relates to fluid conveying apparatus especially adapted for use in loading and unloading marine tankers.

The present invention is an improvement over the apparatus shown in application Serial No. 624,712 filed November 28, 1956, by Peter J. Bily, entitled Fluid Conveying Apparatus, now Patent Number 2,980,150, issued April 18, 1961.

Movement such as that apt to be experienced by a floating ship during loading and unloading requires that apparatus connecting the ship to its dock be flexible. It has been common practice to employ heavy flexible rubber hoses of large diameter for loading and unloading tankers. However, such hoses are inherently unwieldy and require considerable manhandling to manipulate them while being connected and disconnected as well as considerable equipment to support the hose while it is being moved to and from operating position as well as while loading or unloading is in progress. It has been proposed to use articulated hoses formed of swively interconnected metallic sections, and the present invention is concerned with apparatus for handling such hoses.

An object of the present invention is to provide an improved fluid conveying apparatus.

Another object is to provide improved apparatus for use in establishing fluid conveying communication between two relatively movable stations.

Another object is to provide a hose formed of a plurality of relatively inflexible and pivotally interconnected sections which are constructed and supported in a manner enabling them to readily accommodate themselves to the movements of a floating ship with respect to a loading dock while fluid is being transported by the hose between the dock and the ship.

Another object is to provide fluid conveying apparatus which includes an articulated hose mechanism mounted for movement into position to establish connection between a conduit on a loading platform or dock and a conduit on a floating ship.

Another object is to provide a conduit assembly which is swingable over a wide arc between operative and inoperative positions upon opposite sides of a neutral position, which assembly is effectively counterbalanced in any position throughout its entire range of movement.

Another object is to provide a counterbalanced boom and arm assembly including a hydraulic counterweight system so positioned relatively to the assembly as not to interfere with the swinging thereof.

Another object is to provide a counterbalanced boom and arm assembly mounted on a tower which is tiltable relatively to the dock or platform on which the apparatus is mounted to increase the distance below the dock surface through which the apparatus is operable.

Another object is to provide a power driven apparatus for maneuvering the fluid conveying apparatus to and from operating position.

These and other objects and advantages of the present invention will become apparent from the following description and the accompanying drawings, in which:

FIG. 1 is a side elevation of a fluid conveying apparatus embodying the principles of the invention.

FIG. 2 is a front elevation of the apparatus disclosed in FIG. 1.

Figure 3B:
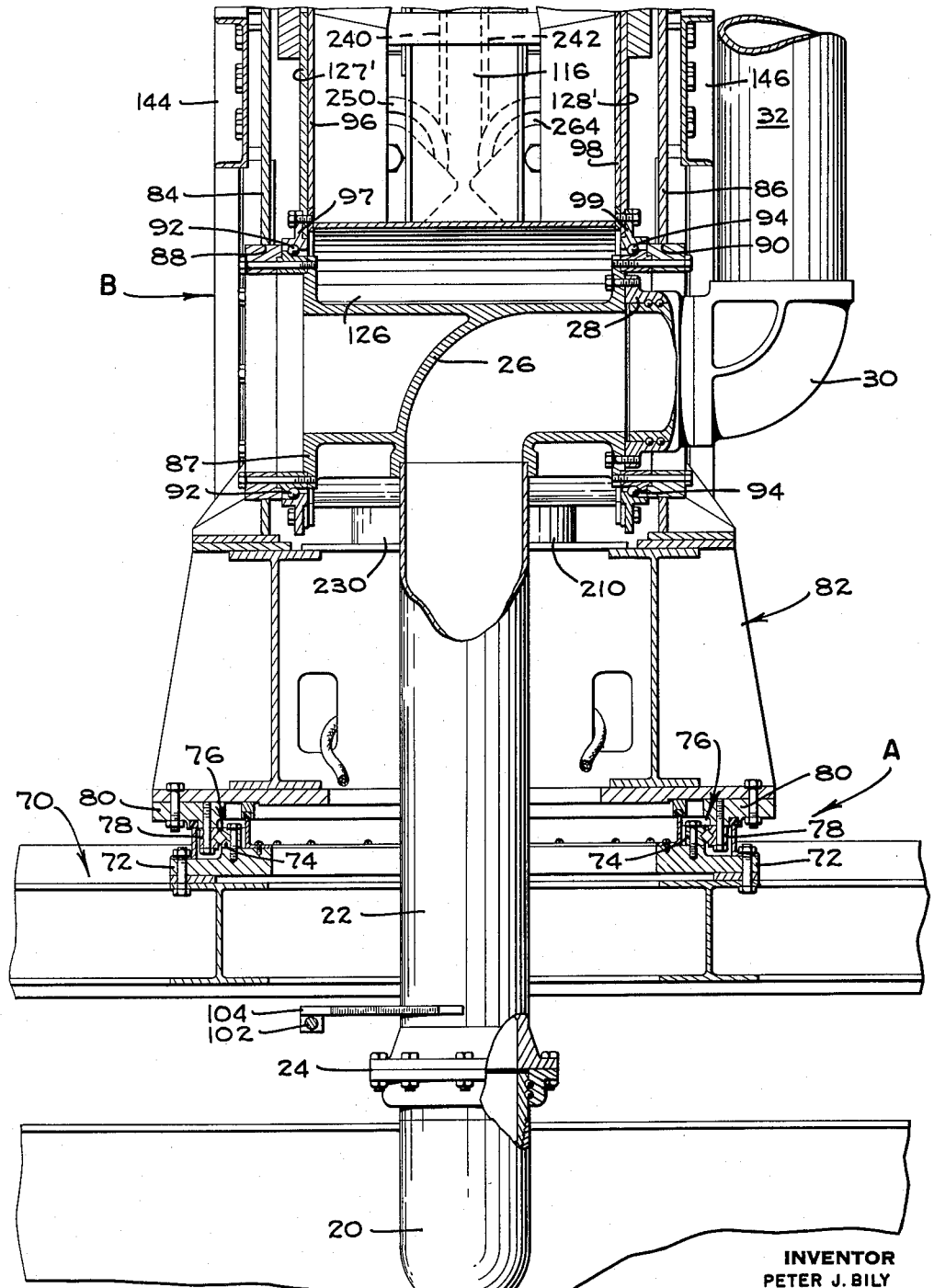

FIGS. 3A and 3B taken together are a section taken generally on line 3—3 of FIG. 1 and drawn to a larger scale.

FIG. 4 is a side elevation showing the apparatus in mounted operating position upon a pier and connected to a fluid conducting pipe or manifold of a ship moored adjacent the pier.

FIG. 5 is a fragmentary plan view taken on line 5—5 of FIG. 4 and illustrating the power unit for moving the arm relatively to the boom.

FIG. 6 is an operational view similar to FIG. 4, showing the apparatus connected to a ship manifold which is a considerable distance lower than the surface of the dock.

FIG. 7 is a fragmentary side elevation drawn to a larger scale and illustrating the tiltable tower portion of the apparatus in its tilted position.

FIG. 8 is a fragmentary plan of the tiltable tower portion of the apparatus illustrated in FIG. 7.

FIG. 9 is a vertical section along line 9—9 of FIG. 8.

FIG. 10 is a side elevation of a hydraulic accumulator unit used in the counterweight system of the apparatus disclosed in FIGS. 1–9.

FIG. 11 is a sectional view along line 11—11 of FIG. 10.

FIG. 12 is a section along line 12—12 of FIG. 11.

FIGS. 13A and 13B taken together are a schematic illustration of the hydraulic circuits used on the apparatus disclosed in FIGS. 1–9.

As shown in FIGS. 1, 2, 4 and 6, the fluid conveying apparatus of the present invention includes a bed assembly A incorporated in or firmly fixed to the pier, loading dock, or other platform P on which the apparatus is mounted, a base assembly B mounted on the bed assembly A for rotation about a vertical axis, a tiltable tower section C mounted on the upper end of the base assembly B for rotation about a horizontal axis, a boom D rotatably connected to the upper end of the tiltable tower section C for rotation about a horizontal axis, an arm E rotatably mounted on the outer end of the boom D for rotation about a horizontal axis, and a coupling assembly F mounted for universal movement on the outer end of the arm E. The dock P is provided with the usual conduit 20 mounted in fixed relation therewith and connected to the usual storage facilities (not shown). The conduit 20 terminates in an upwardly facing vertical section which is connected by a vertical swivel coupling 24 to a rotatable stand pipe 22 mounted within and fixed to the rotatable base B of the apparatus. The upper end of the stand pipe 22 is fixed to a 90° elbow 26 FIG. 2, incorporated in the pivot assembly between the rotatable base B and the tiltable tower C. The elbow 26 is connected by a horizontal swivel coupling 28 to a second 90° elbow 30 (FIGS. 1, 2, 4, and 6), and the elbow 30 is connected to a conduit section 32 which is connected to and moves with the tiltable tower C. The upper end of the conduit section 32 is connected to a 90° elbow 34 which in turn is connected by a horizontal swivel coupling 36 to a second 90° elbow 38 (FIG. 3A) incorporated in the pivot assembly which connects the upper end of the tiltable tower C to the boom D. A conduit 40 rigid with the boom D is connected to the elbow 38 at its inner end, and its outer end is connected to a horizontal 90° elbow 39 (FIG. 5) incorporated within the pivot assembly between the boom D and the arm E. A swivel coupling 42 (FIG. 2) connects the elbow 39 with a 90° elbow 44 (FIGS. 1, 4, 5, and 6), which in turn is connected to a conduit 46 rigid with the arm E. The outer end of the arm conduit 46 is connected by a 90° elbow 48 to a swivel coupling 50 which in turn is connected to a 90° elbow 52 connected by another swivel coupling 54 to another 90° elbow 56 which terminates in a flange 58 adapted to be connected to a similar flange on a standpipe 60 on the ship 62 (FIGS. 4 and 6). The three 90° elbows, 48, 52, and 56, together with the two swivel couplings 50 and 54, provide a mounting of the elbow 56 permitting universal movement of the elbow 56 to facilitate connection of the flange 58 thereon to the mating flange on the standpipe 60 of he ship.

It is intended that one end of the conduit assembly thus far described will be permanently connected to the conduit 20 on the pier P. Suitable power means and controls described hereinbelow are provided whereby a single operator can quickly and accurately manipulate the several sections of the apparatus to move the coupling F into a position to be coupled to the standpipe 60 on the ship 62. The power units and the controls therefor are so designed that if excess hydraulic pressure develops due to movement of one of the elements of the apparatus relative to another, or to one of the elements fouling the ship superstructure while being power driven, the excess pressure will be automatically relieved. The control assembly is further so designed that when the hydraulic system for effecting movement of the several elements is de-energized, the power units for effecting such movements are automatically interconnected for free wheeling movement so that the various elements of the apparatus are free to move with respect to each other, whereby the arm E, the boom D and the tiltable tower C are free to adapt themselves to movements of the ship 62 relative to the dock P with no appreciable resistance.

Referring now more particularly to the drawings, and especially to FIGURES 1, 2, and 3B thereof, the bed assembly A comprises a framework of suitable structural members 70 incorporated within or mounted on the dock P and including a bearing supporting ring 72 fixed to the upper surface thereof, surrounding the standpipe 22 in coaxial relation therewith. The inner race 74 of a bearing assembly 76 is fixed to the bearing support ring 72. The outer race 78 of the bearing assembly 76 is fixed to a ring 80 which in turn supports the rotatable base structure B of the apparatus.

The lower portion of the rotatable base structure B is in the form of a rectangular box 82 made up of suitable structural members and resting on top of the support ring 80. Two side plates 84 and 86 (FIG. 2) are fixed to the upper end of the box 82 and extend upward therefrom. The previously described elbow 26 is provided with an extension 87 which extends in the opposite direction from the open end of the elbow 26 so that externally the elbow is of T-shaped configuration. The bottom end of the T is fixed to the upper end of the standpipe 22 as described hereinabove and the opposite ends of the arms of the T are fixed to circular openings 88 and 90 (FIG. 3B) provided in the side plates 84 and 86, respectively. The inner races of two axially aligned bearing assemblies 92 and 94 are fixed to the side plates and the elbow 26 and surround the openings 88 and 90, respectively. Two frame members 96 and 98 of the tiltable tower assembly C are fixed to the outer races 97 and 99 of the bearing assemblies 92 and 94.

Rotation of the rotatable base assembly B is effected by means of a double acting hydraulic power cylinder 100 (FIGS. 2, 7 and 9) fixed to the frame 70 of the bed assembly A. The operating rod 102 of the power cylinder 100 is connected to a bracket 104 (FIG. 3B) fixed to the outer surface of the standpipe 22 and extending radially therefrom.

The frame of the tiltable tower structure C comprises the mentioned two side members 96 and 98 which project upward from the bearing assemblies 92 and 94 and converge at their upper ends to merge into a single member 110 (FIGS. 2 and 3A). Two side plates 112 and 114 are fixed to the sides of the lower end of the member 110 and extend rearwardly therefrom as shown in FIGS. 1, 4, 6, 7, and 9. A centrally located rear frame member 116 (FIGS. 7 and 9) is fixed at its upper end to the side plates 112 and 114 and extends vertically downward therefrom when the tower C is in its raised or vertical position. A plurality of cross braces 118, 120, 122, and 124 (FIG. 9) are connected between the frame member 116 and a hub 126 surrounding and fastened to the bearing assemblies 92 and 94.

Two arcuate chain guides 127 (FIG. 9) and 128 (FIG. 7) are secured to the outer edges of plates 127 and 128, respectively, which are fastened to the hub 126 adjacent the outer ends thereof. The arcuate guides are disposed in eccentric relation to the hub 126. Two chains 130 and 132 are dead-ended at the upper ends of the guides 127 (FIG. 9) and 128 (FIG. 7), respectively, these being the ends that are at lesser radial distance from the axis of the hub. As the tower tilts, the chains wrap around the guides which, therefor, function as reels upon which the chains wind. The other ends of the chains 130 and 132 are fixed to the operating rods 134 and 136 of the two power cylinders 138 and 140, respectively. The hydraulic cylinders 138 and 140 are fixed to a cross brace 142 (FIGS. 1 and 3A) fastened to the outer ends of two arms 144 and 146 fixed to the side plates 84 and 86, respectively, of the base assembly B.

The power cylinders 138 and 140 may be selectively connected to the hydraulic system for the purpose of lowering or raising the tiltable tower C or may be connected to a source of constant hydraulic pressure to act as a counterweight mechanism for the tiltable tower C as will be described hereinbelow.

The eccentricity of the chain guides 127 and 128 with respect to the axis of rotation of the tower C is such that as the tower tilts downward, the moment arm for the force applied by the hydraulic cylinders 138 and 140 increases in length thus increasing the effective counterbalancing force substantially proportionally with the increase in the moment arm for the force applied by gravity as the center of gravity of the tower C increases its horizontal distance from the axis of tilt. When the tiltable tower C is in its uppermost position as illustrated in FIGS. 1–4, the inner surface 150 of the rear frame member 116 thereof abuts a stop bracket 152 fixed to the lower portion 82 of the base section B.

Two variable output pressure valves 153 and 154 (FIGS. 2 and 9) are fixed to the base B adjacent the pivot axis of the tower C. A cam 155 fixed to the outer race 97 of the bearing 92 is provided with a peripheral cam surface which is slightly eccentric to the axis of the bearing 92. A bell crank assembly 156 (FIG. 9) is pivotally mounted on the valve housings as indicated at 157. One arm of the bell crank assembly 156 carries a cam follower roller 158 which rides on the cam 155, while the other arm of the bell crank assembly 156 actuates the valves 153 and 154 to vary their output pressure as the tower C tilts in a manner and for purposes more fully described hereinbelow in conjunction with the description of the hydraulic circuits.

An upper rear frame member 160 (FIG. 9) extends parallel to the upper portion of the front frame member 110 and is spaced slightly rearwardly therefrom. Two side plates 162 and 164 (FIGS. 3A and 7) are fastened to the side edges of the frame members 160 and 110 to form a rigid box-like construction. The side plates 162 and 164 are fixed to the outer races 166 and 168 (FIG. 3A) of two bearing assemblies 170 and 172, respectively, adjacent the upper end of the tower C. The inner races 174 and 176 of the two bearing assemblies 170 and 172, respectively, are fixed to the frame 180 of the boom D.

The inboard end of the boom frame 180 (the end adjacent the tower C) comprises two circular pulleys 182 and 184 (FIG. 3A) disposed concentrically about the axis of rotation of the bearings 170 and 172, respectively (FIGS. 3A, 7, 8 and 9). Two eccentric cable reels 186 and 188 are fixed to the outer faces of the concentric pulleys 182 and 184. A lattice 190 is rigid with the pulleys 182 and 184 and with the reels 186 and 188 and extends radially outward therefrom and supports the boom conduit 40.

The operating mechanism for controlling movements of the boom D relatively to the tower C are all carried by the tower frame structure and are best understood by reference to FIGS. 7, 8 and 9. A cable 200 (FIGS. 7 and 8) is dead-ended on the boom frame 180 at 202 and is trained clockwise (as viewed in FIG. 7) about the circular pulley 184 and then engages an idler pulley 204 (FIG. 7) rotatably mounted on the plate 114 of the frame of the tower structure C. The cable 200 then passes around a moveable pulley 206 fixed to the end of an operating rod 208 of a first boom positioning cylinder 210 fixed to the frame member 116 of the tower C. The cable is then dead-ended on the plate 114 as illustrated at 212. A second cable 220 (FIGS. 8 and 9) is dead-ended on the boom structure as indicated at 222 and is trained counterclockwise (as viewed in FIG. 9) about the pulley 182 and passes over a pulley 224 rotatably mounted on the plate 112 of the tower C. The cable 220 then passes around a moveable pulley 226 fixed to the operating rod 228 of a second boom positioning cylinder 230 fixed to the frame member 116 of the tower structure C. The cable 220 is then dead-ended on the plate 112. It is to be understood, therefore, that by admitting fluid pressure to one or the other of the cylinders 210 and 230 and simultaneously venting the other of the two cylinders, the boom may be rotated relatively to the tower C in a selected direction.

The counterweighting of the boom D in its various operating positions is effected by means of two cables 240 and 242 dead-ended on the eccentric cable reels 186 and 188, respectively, the end of the cable 242 being illustrated at 244 in FIG. 7. The cable 240 (FIGS. 8 and 9) passes between two idler pulleys 246 and 248 rotatably mounted on the plate 112 of the frame of the tower C. The cable 240 then passes around a movable pulley 250 fixed to the operating rod 252 of a counterweight hydraulic cylinder 254 fixed to the frame member 116 of the tower C. Similarly, the cable 242 (FIGS. 7 and 8) passes between two idler pulleys 260 and 262 rotatably mounted on the plate 114 and around a moveable pulley 264 fixed to the operating rod 266 of a second counterweight cylinder 268 fixed to the frame member 116. Both cables 240 and 242 are dead-ended on a plate 270 (FIG. 8) extending transversely between the two plates 112 and 114. Since the reels 186 and 188 are eccentric with respect to the axis of rotation of the boom D relative to the tower C, the force or torque applied by the cylinders 254 and 268 will vary according to the position of the boom D to effectively counterbalance the same in all of its operative positions.

A micro switch 902 (FIG. 8) is mounted on a bracket 903 fixed to the hydraulic cylinder 210. The switch 902 is actuated by a bracket 900 fixed to the operating rod 208. As the boom D rotates seaward, the rod 208 moves out of the cylinder. As the bracket 900 passes the switch 902, it closes the switch to effect certain changes in the action of the counterweight cylinders 254 and 268 in a manner more fully described hereinbelow in connection with the detailed description of the hydraulic system.

A bracket 280 (FIGS. 1, 4, 6, 7, 8, and 9) is fixed to the plates 112 and 114 on the frame of the tower C and extends up therefrom in position to be contacted by and support a bracket 282 (FIGS. 1, 4, 6, 7, and 9) on the boom D to support the boom D when it is in its rest position illustrated in FIG. 1. Another bracket 286 is fixed to the boom D (FIGS. 1, 4, and 6) and is adapted to be contacted by and support the arm E when it is in its rest position illustrated in FIG. 1.

Two large pulleys 290 (FIGS. 1, 2, 4, 5, and 6) and 292 (FIGS. 2 and 5) are rotatably mounted on the outer end of the boom D. The frame 294 of the arm E is a lattice type of construction and is fixed to the two pulleys 290 and 292. The outer end of the lattice frame 294 is clamped to the conduit 46 of the arm E by a strap 296. The mechanism for counterbalancing the weight of the arm E and for moving the arm E relatively to the boom D is mounted on the boom D and comprises two cables 300 and 302 trained around and fixed to the pulleys 290 and 292, respectively, as illustrated at 304 in FIG. 1. The opposite ends of the cables 300 and 302 are fixed to a crosshead member 306 (FIG. 5) slidably mounted in two opposed guides 308 and 310 fixed to the frame 180 of the boom D. A power cylinder 312 is fixed to the frame 180 of the boom D and the operating rod 314 thereof is fixed to the center of the crosshead member 306. When fluid pressure is admitted to the cylinder 312 the crosshead will be moved inward toward the inner end of the boom D to apply tension to the cables 300 and 302 and thus rotate the arm E clockwise (as viewed in FIGS. 1, 4 and 6) about its pivotal connection with the boom D. Return movement of the arm E is effected by gravity and is controlled by releasing fluid from within the power cylinder 312. As explained below in connection with the hydraulic circuits, the cylinder 312 may be selectively connected to a power source to effect the above-described movement of the arm E relative to the boom D. The cylinder 312 is at all other times connected to a source of fluid under constant light pressure so that the cylinder 312 maintains a light tension in the cables 300 and 302 to prevent their becoming slack.

A hydraulic accumulator mechanism 320 (FIGS. 10, 11, and 12) provides hydraulic fluid under constant pressure. It comprises a rectangular frame 322 adapted to be mounted at any suitable location in the vicinity of the loading arm assembly. Two vertical guide rails 324 and 326 are fixed to opposite sides of the frame 322 in opposed relation to each other. A rectangular platform 328 is mounted for vertical movement within the frame 322 and is provided on opposite sides with two rollers 330 and 332 which engage the opposed groove guide rails 324 and 326. The platform 328 is fixed to an operating rod 334 of a power cylinder 336 which in turn is fixed to an I beam 338 rigid with the upper end of the frame 322. A plurality of weights 340 are positioned on the platform 328 to force the operating rod 334 of the power cylinder 336 downward relatively thereto. A suitable hydraulic line 342 connects the power cylinder 336 with the hydraulic circuit to supply hydraulic fluid under constant pressure for the operation of the counterweight system described more fully hereinbelow in connection with the hydraulic circuit.

Two micro-switches 350 and 352 (FIG. 10) are fixed to the frame 322 and are adapted to be actuated by the platform 328 at its uppermost and lowermost limits of travel, respectively. These micro-switches control the starting and stopping of a pump motor to replenish the fluid within the cylinder 336 whenever the operating rod 334 thereof approaches its lowermost position.

Referring now to the schematic diagram, FIG. 13B, it will be seen that when the operating rod 334 of the accumulator 336 approaches its lowermost position it will actuate the micro-swtich 352 to close an electrical circuit from L1 through line 354 to a magnetic starter 356 and back to L2. This energizes the magnetic starter to close a circuit from L3, L4, and L5 to a pump motor 358. When the pump motor 358 is energized it drives a pump 360 which draws fluid from a reservoir 362 through a strainer 364 and a conduit 366 and discharges the fluid under pressure through a conduit 368 through a check valve 370 and a relief valve 372 into a conduit 342 and a branch conduit 344 to replenish the fluid within the accumulator cylinder 336 thus raising the operating rod 334 within the cylinder 336.

When the operating rod 334 approaches its uppermost position it actuates the micro-switch 350 to close a circuit from L1 through line 374 to the magnetic starter 356 and back to L2. It will be appreciated that the magnetic starter includes a holding circuit (not shown) so that when the switch 352 opens, the starter once energized will keep the circuit from L3, L4, and L5 to the motor 358 closed until such time as the micro-switch 350 is closed. When the circuit including the micro-switch 350 is closed, the magnetic starter 356 is de-energized so that it opens the circuit from L3, L4, and L5 to the motor 358.

The check valve 370 in the conduit 368 prevents fluid from feeding back through the pump 360 to the reservoir 362 when the pump is not operating. If the accumulator piston 334 is at its uppermost position when fluid is being fed from one of the counterweight cylinders back to the accumulator, the excess fluid will be vented through the relief valve 372 to a relief conduit 376 which conducts the fluid back to the reservoir 362.

Fluid under pressure from the accumulator cylinder 336 passes through the conduits 344 and 342 and branch conduits 380 and 382 to the two previously mentioned cam controlled variable pressure output valves 153 and 154 (FIGS. 2, 9, and 13B) and through the hydraulic control apparatus indicated in general at 390 in FIG. 13B to the counterweight cylinders 254 and 268 to counteract the gravity forces acting on the boom D. As the tower C tilts, the cam 155 varies the output pressure of the valves 153 and 154 to decrease the force exerted by the counterweight cylinders 254 and 258 to compensate for the decrease in the effective moment arm of the gravity forces acting through the center of gravity of the boom D. Said change in the moment arm results from rotation of the whole assembly about the tilt axis of the tower C which rotation moves said center of gravity of the boom closer to an imaginary vertical line through the axis of rotation of the boom.

The above-mentioned hydraulic control apparatus 390 comprises the two mentioned valves 153 and 154 whose outlets are both connected to a conduit 392 which is connected to one of two inlet ports of a control valve 394. The branch conduit 380 including a check valve 398 connects the conduit 392 with the conduit 342 so that fluid can flow from the counterweight cylinders 254 and 268 back to the accumulator cylinder 336 by bypassing the valves 153 and 154. The outlet side of the control valve 394 is connected by a conduit 400 through a safety check valve assembly 402 to the counterweight cylinders 254 and 268.

The safety check valve assembly 402 comprises a valve seat 404, a ball valve 406 and a hydraulic actuator mechanism 408 for normally holding the valve 406 off of its seat 404. The actuator mechanism 408 comprises a cylinder 410 within which is mounted a piston 412 constantly urged upward by a spring 413. A piston rod 414 connected to the piston 412 extends through the end of the cylinder 410 and engages the ball valve 406 to keep the same off of its seat 404 as long as pressure is applied to the upper end of the piston 412. A pilot tube 416 connects the upper end of the cylinder 410 with the hydraulic conduit 400. Thus it may be seen that as long as the line 400 is under pressure, fluid can flow freely either into or out of the cylinders 254 and 268. However, if the conduit 400, or any of the conduits leading to the conduit 400, should break, thus relieving the fluid pressure in the conduit 400, the piston 412 will be raised by the spring 413, thus permitting the valve ball 406 to seat on the seat 404 to prevent escape of fluid from the counterweight cylinders 254 and 268. This will maintain the boom D in whatever position it then occupies by means of the hydrostatic lock in the counterweight cylinders 254 and 268.

The conduit 342 from the accumulator cylinder 336 is also connected by a branch conduit 420 (FIG. 13A) to the inlet port of a control valve 422 the outlet of which is connected by a conduit 424 through a second safety check valve assembly 426 to the tilt cylinders 138 and 140 (FIGS. 1–4, 6, and 13B). The safety check valve assembly 426 is similar to the safety valve assembly 402 described above and functions in the same manner to prevent the tilting of the tower C in the event of a break in one of the lines of the hydraulic system. The control valve 422 is adapted to shift control of the tilt cylinders 138 and 140 from the accumulator 320 to a tilt control valve 428 (FIG. 13A) the function of which is described in more detail hereinbelow.

The conduit 342 from the accumulator cylinder 336 terminates at the inlet port of a solenoid controlled pilot valve 430 (FIG. 13A) the function of which will be described hereinbelow.

A branch conduit 432 (FIG. 13B) connects the conduit 344 from the accumulator cylinder 336 to the inlet port of a hydraulically actuated valve 434. The outlet port of the valve 434 is connected by a conduit 436 to the inlet port of a pressure reducing regulating valve 438. The constant pressure outlet of the valve 438 is connected through a check valve assembly 440 to a conduit 442 which connects with a conduit 444 which in turn is connected to the operating cylinder 312 for moving the arm E relatively to the boom D. Thus the cables 300 and 302 (FIGS. 1 and 5) are maintained under light tension at all times when the hydraulically controlled valve 434 is open. The check valve 440 prevents return of the fluid from the arm cylinder 312 to the accumulator 320 when the cables 300 and 302 are under heavy tension due to the arm E being extended outward from the boom D.

The valve 434 (FIG. 13B) is controlled by a hydraulic actuator 450 by pressure applied through a conduit 452 which is connected to one of the outlet ports of the arm control valve 454 (FIG. 13A) the function and operation of which will be described hereinbelow. A bypass conduit 456 connects the conduit 452 to a bleed orifice 458 the discharge of which is connected by a conduit 460 to the relief conduit 376 which leads back to the reservoir 362. Thus it may be seen that at all times, except when pressure is being applied to the conduit 452 by the control valve 454, the pressure is relieved from the conduit 452 by means of the bleed valve 458 and the valve 434 remains in its open position. When pressure is applied to the conduit 452 by manipulation of the control valve 454, the hydraulic actuator 450 shifts the valve 434 to its closed position so that the accumulator pressure is no longer transmitted to the arm cylinder 312.

The various sections of the hydraulic circuit described thus far have each been described in relation to the apparatus either in its rest position or when the outer free end of the arm E is connected to the manifold of a ship, and the control circuits for effecting movement of the various elements of the apparatus are not energized.

It will be noted that the conduit 444 connected to the arm operating cylinder 312 is likewise connected to a main selector valve 500, which is illustrated in FIG. 13A with its core 501 in its upper, valve closing position. When the selector valve 500 is in this position, the conduit 444 is connected through the valve 500 to a conduit 502. The conduit 502 includes a relief valve 504 and communicates with the relief conduit 376. Thus with the selector valve 500 closed, if external force is applied to the arm E causing it to rotate counterclockwise as viewed in FIGS. 4 and 6, relatively to the boom D, the fluid expelled from the cylinder 312 during such movement will pass through the selector valve 500 to the conduit 502 and through the relief valve 504 therein to the relief conduit 376 and back to the reservoir 362. If external force is applied to the arm E causing it to turn clockwise relatively to the boom D as viewed in FIGS. 4 and 6, fluid from the accumulator 320 will pass through the regulator valve 438, the check valve 440, and the conduit 442 into the conduit 444 thus into the cylinder 312 to maintain the cables 300 and 302 under sufficient tension to keep them in proper engagement with their associated pulleys 290 and 292.

Conduits 510 and 512 connected, respectively, to the opposite ends of the rotation controlling cylinder 100 (FIGS. 1, 2, and 13B) are both connected to the selector valve 500, and with the selector valve 500 closed, the conduits 510 and 512 are interconnected by a bypass conduit 514. Therefore, when the selector valve 500 is closed, the apparatus may be rotated about the vertical axis of the standpipe 22 in response to external force without resistance from the rotation cylinder.

Similarly, the two cylinders 210 and 230 which control the movement of the boom D relative to the tower C are connected by conduits 516 and 518, respectively, to the selector valve 500, and when the selector valve is closed, the conduits 516 and 518 are interconnected through a bypass conduit 520, so that the boom D is permitted to move freely relatively to the tower C without interference from the cylinders 210 and 230.

It has already been pointed out that the tower C is permitted to tilt under the control of the pressure of the tilt cylinders from the accumulator assembly 320.

The various circuits just described in connection with the illustrated, closed position of the selector valve 500, which is the position that this valve will be in whenever the control circuit is de-energized, constitute the so-called free wheeling aspect of the invention which permits the various assemblies to move freely relatively to one another under the influence of movements of the ship relative to the wharf when the apparatus is connected to the manifold of the ship.

When it is desired to move the apparatus relatively to the ship, either from its rest position toward the ship, or from the ship to its rest position, the control elements are energized by closing an electrical switch 530 illustrated in the upper left-hand corner of FIG. 13A. Closing of the switch 530 completes a circuit from L6 and L7 through lines 532 and 534 to a solenoid 536 which controls the operation of the previously mentioned pilot valve 430. In the position of the valve 430 illustrated, a hydraulic actuator 538 for the selector valve 500 is being vented through a conduit 540, the selector valve 430, and a conduit 542 to the return conduit 376. When the solenoid 536 is energized, the control valve 430 is shifted to connect the conduit 540 to the conduit 342 so that the accumulator pressure in the conduit 342 is applied to the hydraulic actuator 538 to shift the core 501 of the selector valve 500 downward thus closing the two bypass conduits 514 and 520 and closing the relief conduit 502. Simultaneously, it connects the conduits 510 and 512 connected to the rotation controlling cylinder 100 to conduits 550 and 552, respectively, which conduits are connected, respectively, to the two outlet ports of a rotation controlling valve 554. Similarly, the two conduits 516 and 518 associated with the boom operating cylinders 210 and 230, respectively, will be connected to two conduits 556 and 558, respectively, which are similarly connected to the two outlet ports of a boom control valve 560. At the same time, the conduit 444 from the arm controlling cylinder 312 is connected to a conduit 562 which is connected to one of the outlet ports of the previously mentioned arm control valve 454.

Closing of the switch 530 connects lines L6 and L7 through lines 600 and 602 to a magnetic starter 604 which when energized closes a circuit from L3, L4, and L5 to a pump motor 606. The pump motor 606 drives a pump 608 which draws fluid from the reservoir 362 through a strainer 610 and a suction tube 612. The output of the pump 608 is pumped through a conduit 614 to the inlet port of the mentioned tilt control valve 428. A relief valve 616 is incorporated in the conduit 614 and is adapted to vent any excess pressure therein through a bypass conduit 618 to the return conduit 376 and thus back to the reservoir 362. Similarly, a check valve 620 is incorporated in the conduit 614 to prevent any back flow of fluid through the pump 608 and the suction conduit 612 to the reservoir 362.

If the tilt control valve 428 is in its central position as illustrated, the pressure fluid from the conduit 614 will pass therethrough into a conduit 622 which is connected to the inlet port of the boom control valve 560. If the valve 560 is in its central position as illustrated, the pressure fluid from the conduit 622 will pass directly therethrough and into a conduit 624 connected to the inlet port of the rotation control valve 554. If the valve 554 is in its central position as illustrated, the pressure fluid from the conduit 624 will pass therethrough and into a conduit 626 connected to the inlet port of the arm control valve 454. If the arm control valve 454 is in its central position as illustrated, the fluid will pass therethrough and into a conduit 628 which is connected to the return conduit 376. Thus when the pump 608 is operating and all of the control valves 428, 560, 554 and 454 are in their central positions, the fluid from the pump will pass directly therethrough and return to the reservoir 362.

Assuming now that the apparatus is in its rest position illustrated in FIG. 1, and it is desired to rotate the boom D relatively to the tower C and in a seaward direction, the control valve 560 should be moved to the left as viewed in FIG. 13A, by means of the handle 650. This movement of the control valve 560 connects the conduit 622 to the conduit 558 and connects the conduit 556 to a relief conduit 652 which leads through a conduit 654 to the return conduit 376. In this position of the valve 560, pressure fluid from the conduit 622 is conducted through the conduit 558 and a bypass conduit 656 which bypasses a flow restrictive orifice 658 in the conduit 558 and through the selector valve 500 to the conduit 518 to the boom cylinder 230. This effects outward, or seaward, movement of the boom D, and the fluid expelled from the cylinder 210 as a consequence of such boom movement flows through the conduit 516, the selector valve 500 and conduit 556 through a restrictive orifice 660 incorporated therein, through the valve 560 to the relief conduit 652 and the conduit 654 and thus back to the reservoir 362.

If it is desired to return the boom D to its rest position, the handle 650 is pushed inward or to the right as illustrated in FIG. 13A. In the resulting position of the valve 560, the pressure conduit 622 is connected to the conduit 556 and the conduit 558 is connected to the relief conduit 652. Thus pressure fluid from the conduit 622 is conducted through the conduit 556 and by a bypass conduit 662 having therein a check valve 664, and bypasses the restricted orifice 660 back to the conduit 556, through the selector valve 500 to the conduit 516 and thus to the cylinder 210. In this case the fluid expelled from the cylinder 230 flows through the conduit 518, the selector valve 500, to the conduit 558. It cannot pass through the bypass conduit 656 because of the check valve 666 therein, and therefore must pass through the restricted orifice 658 and through the valve 560 to the relief conduit 652 and back to the reservoir 362 through the conduits and return conduit 376. Thus it will be seen that the pressure fluid passes freely to the cylinder being actuated thereby but that the fluid being returned from the opposing cylinder is metered through a restricted orifice to control the rapidity of movement of the boom D relative to the tower C.

It is to be noted that the conduits 556 and 558 are cross-connected in such manner that if movement of the boom D relative to the tower C should be effected by movement of the ship relative to the dock when the valve 500 is in its open position, damage to the apparatus will be avoided. Excess pressure in the conduit 556 caused by such movement of the boom D relative to the tower C will be vented from conduit 556 to the conduit 558 through a bypass conduit 670 which incorporates a relief valve 672 and a check valve 674 which prevents fluid flow in the opposite direction through the bypass conduit 670. Similarly, if excess pressure develops in the conduit 558 fluid will be vented therefrom through a bypass conduit 676 to the conduit 556 through a relief valve 678 incorporated in the bypass conduit 676 and a check valve 680 which prevents the opposite flow of fluid through the bypass conduit 676. Thus it may be seen that the bypass conduits 670 and 676 provide for movement of the boom D relative to the tower C under the influence of movements of the ship relative to the dock even when the power control circuit is energized much in the same manner as the free wheeling connection described above. The relief valves 672 and 678 are so adjusted that the minimum pressure at which they open is higher than the pressure admitted to the conduit 614 by the valve 616, so as to prevent the valves 672 and 678 from opening while the boom is being moved by manipulation of the control valve 554.

Rotation of the apparatus about a vertical axis and relative to the dock P is controlled by movement of the control valve 554 by means of its handle 700. If the handle is moved to the right as viewed in FIG. 13A the pressure conduit 624 will be connected to the conduit 552 and the conduit 550 will be connected to a relief conduit 702 which communicates with the return conduit 376. With the control valve 554 in this position, pressure fluid from the line 624 is carried through the conduit 552 and bypass conduit 704 and check valve 706 around a restricted orifice 708 in the conduit 552 in the same manner as described above in connection with the boom operating circuits. The conduit 552 is connected through the selector valve 500 to conduit 512 to shift the operating rod 102 of the cylinder 100 to the left as viewed in FIG. 13B, thereby causing the apparatus to turn in one direction. The fluid expelled from the left end of the cylinder 100 flows through the conduit 510, the selector valve 500 and conduit 550 and through a restricted orifice 710 therein, through the control valve 554 to the relief conduit 702, and thus back to the reservoir through the return conduit 376.

If the control valve 554 is shifted to the left as viewed in FIG. 13A, the pressure conduit 624 will be conected to the conduit 550 and the conduit 552 will be connected to the relief conduit 702. Hence, in this position of the control valve 554, pressure fluid from the conduit 624 flows through the valve 554 to the conduit 550 and through a bypass conduit 712 and check valve 714 to bypass the restricted orifice 710 back to the conduit 550 through the selector valve 500 and conduit 510 to the left end of the cylinder 100, thus causing the apparatus to turn in the other direction. The fluid expelled from the right end of the cylinder 100 travels through conduit 512, selector valve 500, conduit 552. It cannot pass through the bypass conduit 704 because of the check valve 706 and, therefore, must pass through the restricted orifice 708 back to the control valve 554 and through the valve to the relief conduit 702.

The conduits 550 and 552 are interconnected by bypass conduits 720 and 722 to permit rotation of the apparatus relative to the dock P under the influence of movement of the ship to which it is connected even when the control circuits are energized, in the same manner as described above in connection with the boom operating circuits. It is for this purpose that the conduit 720 is provided with a relief valve 724 and a check valve 726, and the bypass conduit 722 is provided with a relief valve 728 and a check valve 730.

Movement of the arm E relatively to the boom D is effected by supplying pressurized fluid to the arm operating cylinder 312 to rotate the arm clockwise (as viewed in FIG. 1) or by releasing fluid from the arm cylinder 312 to permit the arm E to rotate counterclockwise under the influence of gravity. These movements are controlled by the handle 750 of the arm control valve 454. When the handle 750 is moved to the right as viewed in FIG. 13A, pressurized fluid from the conduit 626 enters the conduit 562 and passes through a bypass conduit 752 and a check valve 754 to bypass a restricted orifice 756 in the conduit 562, and then flows through the selector valve 500 and the conduit 444 to the cylinder 312. The high-pressure fluid from the line 444 is prevented from feeding back to the accumulator cylinder 336 through the conduit 442 by the previously mentioned check valve 440.

Reverse movement of the arm E relative to the boom D under the influence of gravity is effected by moving the control handle 750 to the left as viewed in FIG. 13A, thus connecting the conduit 562 to a relief conduit 758 which communicates with the return conduit 376. Return flow of fluid from the cylinder 312 is forced by the check valve 754 to flow through the metering orifice 756 with the result that the rate at which the arm E moves under the influence of gravity is restricted. At the same time that the conduit 562 is connected to the relief conduit 758 the high-pressure fluid conduit 626 is connected to conduit 452 to thereby actuate the hydraulic actuator 450 to close the valve 434 to prevent discharge of the accumulator cylinder 336 through the conduit 436, the valve 438 and the conduit 442 into the conduit 444. When the valve 454 is returned to its neutral position, the pressure from the line 452 is vented through the bleed orifice 458 in the manner described above to permit the valve 434 to return to its open position illustrated in FIG. 13B.

The above described movements of the apparatus, namely, rotation of the assembly, movement of the boom D relative to the tower C, and movement of the arm E relative to the boom D will accommodate most positions of a ship with relation to the surface of the dock P. However, in cases where the ship is located at a considerable distance below the dock surface, downward reach of the apparatus is extended by tilting movement of the tower C.

Movement of the tiltable tower C relative to the base B is caused by the tilt cylinders 138 and 140 and by the tilt control valve 428 previously mentioned. In order to effect tilting movement of the tower C, the manual valve 422 is shifted to the right as viewed in FIG. 13A, by movement of the handle 800 thereof to disconnect the conduit 424 from the conduit 420 and to connect the conduit 424 to a conduit 802 which is connected to one of the outlet ports of the control valve 428. As in the case with the conduits connected to the other control valves, the conduit 802 is provided with a restricted orifice 804 and a bypass passageway 806 which bypasses the orifice 804 and is provided with a check valve 808 which permits free flow from the valve 428 toward the tilt cylinders but prevents flow in the opposite direction.

After the valve 422 has been shifted to transfer control of the tilt cylinders 138 and 140 from the accumulator 336 to the control valve 428, movement of the control valve 428 to the left by movement of its handle 810 permits fluid from the tilt cylinders 138 and 140 to vent through the conduit 424, the conduit 802, the restricted orifice 804 to a vent conduit 812 which is connected by the conduit 502 to the return conduit 376. The venting of the tilt cylinders 138 and 140 in the manner described above permits the tower C to tilt under the influence of gravity. Return movement of the tower C relative to the base B is effected by moving the handle 810 of the valve 428 to the right as viewed in FIG. 13A, thus applying high-pressure fluid from the conduit 614 to the conduit 802, through the bypass conduit 806, the valve 422 and the conduit 424 to the titlt cylinders 138 and 140.

It should be noted that during the first portion of travel of the boom D from its rest position illustrated in FIG. 1 until the boom D assumes a substantially vertical position, the pistons in the counterweight cylinders 254 and 268 will be retracted under the influence of pressure from the accumulator cylinder 336 in the manner described hereinabove. When the boom D reaches the neutral position, at which there are no torque forces due to gravity acting thereon, the bracket 900 (FIGS. 8 and 13B) fixed to the rod 208 of the boom-operating cylinder 210, which is being propelled out of its cylinder 210 as the boom D rotates counter-clockwise (as viewed in FIGS. 2 and 4) relatively to the tower C, closes a switch 902 which completes a circuit from L6 through switch 530, line 602, a line 904, switch 902 and a line 906 to a solenoid 908 and back through a line 910 and line 600 to L7. When the solenoid 908 is energized, it shifts a pilot valve 912 which permits pressure from the accumulator cylinder 336 to pass from the above-mentioned conduit 392 through a branch conduit 914, the valve 912 and a conduit 916 to a hydraulic actuator 918 which shifts the counterweight control valve 394 so that the counterweight cylinders are no longer subject to accumulator pressure but rather are connected to a conduit 920 which communicates with the conduit 516 leading to the boom operating cylinder 210. Thus the counterweight cylinders 254 and 268 are automatically transferred to the control of the boom control valve 560 and operate in conjunction with the boom operating cylinder 210 to control the movement of the boom D relatively to the tower C. It will be appreciated that once the desired movements of the apparatus have been effected and the switch 530 is opened to de-energize the control circuits, the solenoid 908 will be de-energized and the valve 912 will shift back, permitting the hydraulic actuator 918 for the valve 394 to vent through the valve 912 to a vent conduit 930 which is connected to conduit 618 which vents to the return conduit 376. When the hydraulic actuator 918 vents, the valve 394 will shift back to the position illustrated, to shift the control of the counterweight cylinders from the control valve 560 back to the accumulator pressure. Similarly, as the boom D is rotated clockwise relatively to the tower C to approach its rest position and passes through the neutral position described above, the bracket 900 again actuates the switch 902 to open the same so that the accumulator pressure is again applied to the counterweight cylinders, rather than the operating pressure from the control valve 560, so that the counterweight cylinders 254 and 268 will not be opposing the action of the cylinder 210 which is rotating the boom to its rest position.

While a preferred form of the invention has been described herein it should be noted that various changes may be made therein without departing from the spirit of the invention as defined in the appended claims.

The invention having thus been described what is claimed and desired to be protected by Letters Patent is:

1. Apparatus for establishing fluid-conveying interconnection between two fluid handling means, comprising a fluid tight conduit including at least three rigid sections and swivel pipe joints pivotally interconnecting adjacent sections, tower means mounted for pivotal movement about a horizontal axis adjacent its base, means connecting one of said conduit sections to said tower, means swively connecting said one conduit section to one of said fluid handling means, a boom mounted adjacent the upper end of said tower for pivotal movement about a horizontal axis from a retracted position to a projected position, means connecting a second conduit section to the boom for movement therewith, and an arm pivotally connected to the outer end of the boom and rigidly connected to a third conduit section and operable to maneuver the outer end of said third conduit section to a position adjacent the other of said fluid handling means.

2. Apparatus for interconnecting a fixed fluid handling means and a portable fluid handling means temporarily disposed within the vicinity of the fixed fluid handling means, comprising a tower mounted adjacent said fixed fluid handling means, said tower being mounted for movement from a retracted position toward the portable fluid handling means, a boom pivotally connected to the upper end of said tower, a fluid-conducting conduit including a plurality of rigid tubing sections and a swivel pipe coupling pivotally interconnecting each two adjacent tubing sections, one of said conduit sections being pivotally connected to said fixed fluid handling means and rigidly connected to said tower, means connecting another of said conduit sections to said boom for support thereby, an arm pivotally connected to the outer end of said boom, a third section of said conduit rigidly connected to said arm and having releasable coupling means at its free end and means adjustably interconnecting the boom and said arm and operable to maneuver said coupling means into position adjacent the portable fluid handling means.

3. In an apparatus for establishing fluid conveying connection between two fluid containers, a tower pivotally mounted for movement about a horizontal axis adjacent its base, a boom mounted adjacent the upper end of said tower for pivotal movement about a horizontal axis, means for counterbalancing the boom including a hydraulic means mounted on the tower for applying force to the boom eccentrically with relation to its axis of rotation and at a radial distance therefrom that varies as the center of gravity of the boom alters its horizonal distance from said pivot axis of the boom, and means responsive to movement of the tower to vary the hydraulic force acting on the boom.

4. Apparatus for interconnecting a first fluid container on a dock and a second fluid container on a ship adjacent the dock, comprising a conduit assembly including a plurality of rigid tubes, a swivel pipe joint interconnecting each two adjacent tubes for relative pivotal movement, a tower mounted on said dock for pivotal movement about a horizontal axis, a boom pivotally mounted on the upper end of said tower and movable to a position retracted from the ship or to a position projected toward the ship, means rigidly connecting one of the tubes to said tower, means connecting another of the tubes to the boom, means for moving the boom to either of said positions, arm means pivotally connected to the outer end of the boom and rigidly connected to another of said tubes, means connected to said arm and operable when the boom is in said projected position for maneuvering the outer end of the last mentioned tube to a position adjacent said second container, and means for releasably coupling said outer end of the last mentioned tube to said second fluid container.

5. In an apparatus for interconnecting a first fluid handling means on a dock and a second fluid handling means on a ship adjacent said dock, a tower pivotally mounted on said dock for tilting movement toward and away from said ship, a boom rotatably mounted on the upper end of said tower, an arm rotatably mounted on the outer end of said boom, hydraulic means mounted on said tower and connected to said boom to apply a counterbalancing force to said boom, value means mounted on the dock for admitting fluid under pressure to said hydraulic means to develop said counterbalancing force, and cam means mounted on said tower for movement therewith and engaging said valve means to vary the pressure admitted to said hydraulic means in relation to the attitude of said tower relative to said dock.

6. In an apparatus for interconnecting a first fluid handling means on a dock and a second fluid handling means on a ship adjacent said dock, a tower pivotally mounted on said dock for tilting movement toward and away from said ship, a boom rotatably mounted on the upper end of said tower, an arm rotatably mounted on the outer end of said boom, hydraulic means mounted on said tower and connected to said boom to exert a counterbalancing force on said boom, value means mounted on the dock for admitting fluid under pressure to said hydraulic means to develop said counterbalancing force, and cam means mounted on said tower for movement therewith and engaging said valve means to decrease the pressure admitted to said hydraulic means in response to an increase in the degree of tilt of said tower relative to said dock.

7. In an apparatus for interconnecting a first fluid handling means on a dock and a second fluid handling means on a ship adjacent said dock, a tower pivotally mounted on said dock for tilting movement toward and away from said ship, a boom rotatably mounted on the upper end of said tower, an arm rotatably mounted on the outer end of said boom, hydraulic means mounted on said tower and connected to said boom to exert a counterbalancing force on said boom, means to vary the effective moment arm of said counterbalancing force according to the position of said boom relative to said tower, value means fixed to said dock for admitting fluid under pressure to said hydraulic means to develop said counterbalancing force, and cam means mounted on said tower for movement therewith and engaging said valve means to vary the pressure admitted to said hydraulic means in accordance with the attitude of said tower relative to said dock.

8. In an apparatus for interconnecting a first fluid handling means on a dock and a second fluid handling means on a ship adjacent said dock, a tower pivotally mounted on said dock for tilting movement toward and away from said ship, hydraulic means connected to said tower for controlling tilting movement of said tower relative to said dock, and means for selectively connecting said hydraulic means either to a source of constant pressure to counterbalance said tower or to a control valve selectively operable to admit fluid under high pressure to said hydraulic means or to bleed fluid from said hydraulic means to effect movement of said tower relative to said dock.

9. In an apparatus for interconnecting a first fluid handling means on a dock and a second fluid handling means on a ship adjacent said dock, a tower pivotally mounted on said dock for tilting movement toward and away from said ship, a boom rotatably mounted on the upper end of said tower, an arm rotatably mounted on the outer end of said boom, hydraulic means connected to said tower for controlling tilting movement of said tower relative to said dock, means for selectively connecting said hydraulic means to a source of constant pressure to counterbalance said tower or to a control valve selectively operable to admit fluid under high pressure to said hydraulic means or to bleed fluid from said hydraulic means to effect movement of said tower relative to said dock, hydraulic means for effecting movement of said boom relative to said tower, and hydraulic means for effecting movement of said arm relative to said boom.

10. In an apparatus for interconnecting a first fluid handling means on a dock and a second fluid handling means on a ship adjacent said dock, a tower pivotally mounted on said dock for tilting movement toward and away from said ship, a boom rotatably mounted on the upper end of said tower, an arm rotatably mounted on the outer end of said boom, a conduit including three rigid swivelly interconnected sections, means for rigidly connecting said conduit sections respectively to said tower, said boom, and said arm, hydraulic means connected to said tower for controlling tilting movement of said tower relative to said dock, and means for selectively connecting said hydraulic means either to a source of constant pressure to counterbalance said tower or to a control valve selectively operable to admit fluid under high pressure to said hydraulic means or to bleed fluid from said hydraulic means to effect movement of said tower relative to said dock.

11. In an apparatus for interconnecting a first fluid handling means on a dock and a second fluid handling means on a ship adjacent the dock, a tower pivotally mounted on the dock for tilting movement toward and away from said ship, a boom rotatably mounted on the upper end of said tower, an arm rotatably mounted on the outer end of said boom, a conduit including three rigid swivelly interconnected sections, means for rigidly connecting said conduit sections respectively to said tower, said boom, and said arm, means for pivotally connecting the conduit section associated with said tower to said first fluid handling means, means for releasably connecting the conduit section associated with said arm to said second fluid handling means, hydraulic means for effecting tilting movement of said tower relative to said dock, hydraulic means for rotating said boom relative to said tower, and hydraulic means for rotating said arm relative to said boom.

12. In an apparatus for interconnecting a first fluid handling means on a dock and a second fluid handling means on a ship adjacent the dock, a tower mounted on the dock for rotation about a vertical axis and for tilting movement toward and away from said ship, a boom rotatably mounted on the upper end of said tower, an arm rotatably mounted on the outer end of said boom, a conduit including three rigid swivelly interconnected sections, means for connecting said conduit sections respectively to said tower, said boom, and said arm, means for pivotally connecting the conduit section associated with said tower to said first fluid handling means for universal movement with respect thereto, means for releasably connecting the conduit section associated with said arm to said second fluid handling means, hydraulic means for turning the tower about said vertical axis, hydraulic means for effecting tilting movement of said tower relative to the dock, hydraulic means for rotating the boom relative to the tower, and hydraulic means for rotating the arm relative to the boom.

13. In an apparatus for interconnecting a first fluid container on a dock and a second fluid container on a ship adjacent the dock, a base mounted on said dock for rotation about a vertical axis, a tower pivotally mounted on said base for tilting movement about a horizontal axis toward and away from said ship, a boom rotatably mounted on the upper end of said tower, an arm rotatably mounted on the outer end of said boom, a conduit including three rigid swivelly interconnected sections, means for rigidly connecting said conduit sections respectively to the tower, the boom, and the arm, means for pivotally connecting the conduit section associated with the tower to said first fluid container for universal movement with respect thereto, means for releasably connecting the conduit section associated with the arm to said second fluid container, hydraulic means for effecting rotation of said base, hydraulic means for effecting tilting movement of said tower relative to the base, hydraulic means for rotating the boom relative to the tower, and hydraulic means for rotating the arm relative to the boom.

14. In an apparatus for interconnecting a first fluid container on a dock and second fluid container on a ship adjacent the dock, a tower pivotally mounted on the dock for tilting movement toward and away from said ship, a boom rotatably mounted on the upper end of the tower, an arm rotatably mounted on the outer end of said boom, a conduit comprising three rigid swivelly interconnected sections, means for rigidly connecting said conduit sections respectively to the tower, the boom, and the arm, means for pivotally connecting the section associated with the tower to the fluid container on the dock, means for releasably connecting the conduit section associated with the arm to the fluid container on the ship, hydraulic means for effecting tilting movement of said tower relative to said dock, hydraulic means for rotating said boom relative to the tower, hydraulic means for rotating the arm relative to the boom, means for selectively controlling the several hydraulic means to effect powered movement of the tower, the boom, and the arm relative to each other, and means for selectively energizing said control means to effect powered movement of said tower, boom and arm relative to each other or for cross connecting said several hydraulic means to effect free movement of said tower, boom, and arm relative to each other when the ship moves relatively to the dock.

15. In an apparatus for interconnecting a first fluid handling means on a dock and a second fluid handling means on a ship adjacent the dock, a tower pivotally mounted on the dock for tilting movement toward and away from said ship, a boom rotatably mounted on the upper end of the tower, hydraulic means for counterbalancing the weight of said boom, means for applying regulated fluid pressure to said hydraulic counterbalancing means, hydraulic means for rotating said boom relatively to the tower, means for selectively controlling the hydraulic boom rotating means to effect powered movement of the boom, means for selectively energizing said control means, and means to shift said counterbalance means to the control of said control means throughout a certain range of movement of the boom when said control means is energized, said hydraulic counterbalance means being connected to said hydraulic counterbalance pressure applying means throughout the remainder of the range of movement of the boom and when said control means is de-energized regardless of the position of said boom.

16. In apparatus for handling a flexible conduit, a tiltably mounted tower, a boom pivotally mounted on the tower, means for attaching a flexible conduit to said tower and to said boom with a part of the conduit extending beyond the boom, an arm pivotally mounted on the boom, means for connecting the arm to said part of the conduit which is beyond the boom, means mounted on the boom and connected to the arm for pivoting the arm relatively to the boom to maneuver said part of the conduit which is beyond the boom, means for counterbalancing the boom including power means mounted on the tower for applying force to the boom eccentrically with relation to the pivot axis of the boom, and means responsive to tilting movement of the tower to vary the magnitude of the force applied by said power means to the boom.

17. In apparatus for handling a flexible conduit, a movably mounted tower, a boom pivotally mounted on the tower, means for attaching a flexible conduit to said tower and to said boom with a part of the conduit extending beyond the boom, an arm pivotally mounted on the boom, means for connecting the arm to said part of the conduit which is beyond the boom, means mounted on the boom and connected to the arm for pivoting the arm relatively to the boom to maneuver said part of the conduit which is beyond the boom, means for counterbalancing the boom including power means mounted on the tower, and means for applying the force exerted by said power means to the boom eccentrically with relation to the pivot axis of the boom and at a radial distance therefrom which varies as the center of gravity of the boom alters its horizontal distance from said axis.

References Cited in the file of this patent
UNITED STATES PATENTS

| | | |
|---|---|---|
| 1,680,831 | White | Aug. 14, 1928 |
| 2,818,891 | Loeser | Jan. 7, 1958 |
| 2,922,446 | Sheiry | Jan. 26, 1960 |